US008005106B2

(12) United States Patent  
Pan et al.

(10) Patent No.: US 8,005,106 B2
(45) Date of Patent: Aug. 23, 2011

(54) APPARATUS AND METHODS FOR HYBRID FAIR BANDWIDTH ALLOCATION AND DROP PRECEDENCE

(75) Inventors: Rong Pan, Sunnyvale, CA (US); Ming Zhang, San Jose, CA (US); Chiara Piglione, San Jose, CA (US); Valentina Alaria, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 12/469,930

(22) Filed: May 21, 2009

(65) Prior Publication Data

US 2010/0296398 A1 Nov. 25, 2010

(51) Int. Cl.
*H04L 12/54* (2006.01)
(52) U.S. Cl. ... 370/429; 370/229; 370/235; 370/395.41; 370/395.42
(58) Field of Classification Search ............... 370/229, 370/235, 359, 395.41, 395.42, 412–419, 370/429
See application file for complete search history.

(56) References Cited

U.S. PATENT DOCUMENTS

| | | | |
|---|---|---|---|
| 6,463,068 B1 | 10/2002 | Lin et al. | |
| 6,961,307 B1* | 11/2005 | Aweya et al. | 370/230 |
| 6,985,442 B1 | 1/2006 | Wang et al. | |
| 7,088,678 B1* | 8/2006 | Freed et al. | 370/230 |
| 7,218,608 B1* | 5/2007 | Fang et al. | 370/229 |
| 7,336,611 B1* | 2/2008 | Aweya et al. | 370/235 |
| 7,383,349 B2* | 6/2008 | Lodha | 709/232 |
| 7,680,139 B1* | 3/2010 | Jones et al. | 370/414 |
| 2002/0009051 A1* | 1/2002 | Cloonan | 370/232 |
| 2003/0048791 A1* | 3/2003 | De Cnodder et al. | 370/395.42 |
| 2004/0125796 A1* | 7/2004 | Reader | 370/359 |
| 2007/0058649 A1* | 3/2007 | Kytomaa et al. | 370/412 |
| 2007/0091802 A1* | 4/2007 | Pan et al. | 370/230 |
| 2007/0201499 A1* | 8/2007 | Kapoor et al. | 370/412 |
| 2009/0010162 A1 | 1/2009 | Bergamasco et al. | |

OTHER PUBLICATIONS

Pan et al., Approximate Fairness through Differential Dropping, printed from the world wide web on Apr. 28, 2009.

* cited by examiner

*Primary Examiner* — Kwang B Yao
*Assistant Examiner* — Nguyen Ngo
(74) *Attorney, Agent, or Firm* — Weaver Austin Villeneuve & Sampson LLP (57) ABSTRACT

In one embodiment, apparatus and methods for apparatus and methods for fair bandwidth allocation are disclosed. In one embodiment, a method includes (i) determining a drop probability for each of a plurality of classes of packets being dropped or admitted to a queue, wherein each drop probability is based on a weighted fair bandwidth allocation process that is performed with respect to the plurality of classes and a plurality of packet arrival rates and predefined weights for such classes; and (ii) dropping a particular packet or admitting such particular packet to the queue based on the drop probability for such particular packet's class, wherein such dropping or admitting operation is further based on one or more drop precedence factors that are also determined periodically for each class if such one or more drop precedence factors are selected for such each class. In other embodiments, the invention pertains to an apparatus having one or more processors and one or more memory, wherein at least one of the processors and memory are adapted for performing the above described method operations.

18 Claims, 8 Drawing Sheets

APPARATUS AND METHODS FOR HYBRID FAIR BANDWIDTH ALLOCATION AND DROP PRECEDENCE

BACKGROUND

In many networking implementations, a high-speed packet buffer may be used to store packets during periods of congestion. Being a scarce and expensive resource, it is important to maximize the use of such buffers. Accordingly, there continues to be a need for improved methods and mechanisms for efficiently utilizing buffers.

BRIEF DESCRIPTION OF THE DRAWINGS

The present invention is illustrated by way of example, and not by way of limitation.

DESCRIPTION OF EXAMPLE EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Overview

In one embodiment, apparatus and methods for fair bandwidth allocation are disclosed. In one embodiment, a method includes (i) determining a drop probability for each of a plurality of classes of packets being dropped or admitted to a queue, wherein each drop probability is based on a weighted fair bandwidth allocation process that is performed with respect to the plurality of classes and a plurality of packet arrival rates and predefined weights for such classes; and (ii) dropping a particular packet or admitting such particular packet to the queue based on the drop probability for such particular packet's class, wherein such dropping or admitting operation is further based on one or more drop precedence factors that are also determined periodically for each class if such one or more drop precedence factors are selected for such each class. In other embodiments, the invention pertains to an apparatus having one or more processors and one or more memory, wherein at least one of the processors and memory are adapted for performing the above described method operations.

Specific Example Embodiments

Figure 1:
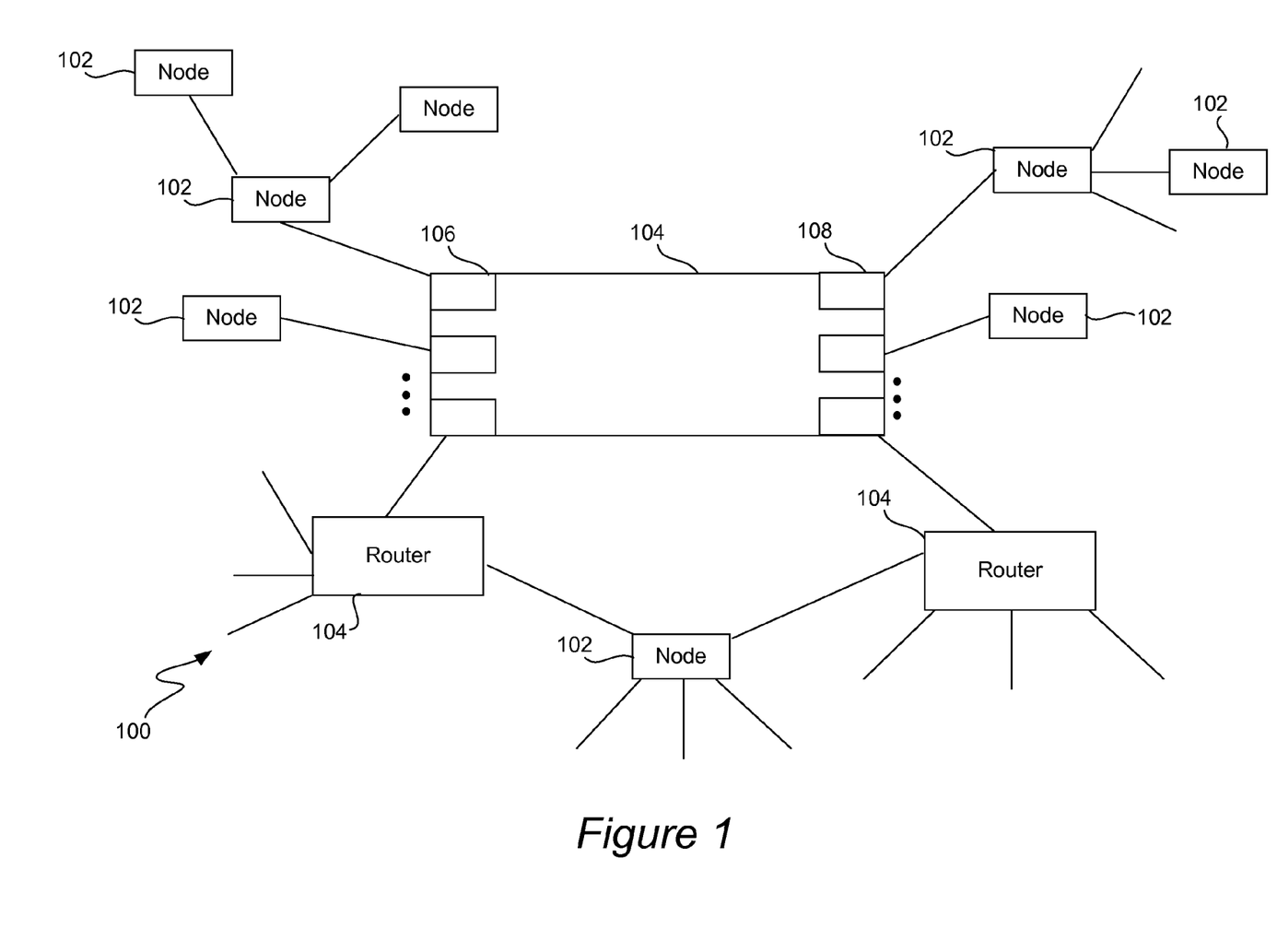
FIG. 1 illustrates a network portion in which hybrid fair bandwidth allocation and drop precedence embodiments of the present invention may be implemented.

Techniques for fair bandwidth allocation may be implemented in any suitable manner and depends on the particular protocols and/or applications being utilized by the particular network device. FIG. 1 illustrates a network portion 100 in which hybrid fair bandwidth allocation and drop precedence embodiments of the present invention may be implemented. Referring now to FIG. 1, a network 100 includes a plurality of nodes 102 that transmit packets to other nodes 102 through network devices, e.g., routers 104.

One or more nodes 102 may be configured to assign packets to classes of service based on information contained in the packets (e.g., source address) and/or on predetermined traffic management rules that are provided by a network manager and/or various service providers. Alternatively, other entities, e.g., routers or nodes, may assign packets to classes based on information contained in the packets and/or on predetermined traffic management rules that are provided by a network manager and/or various service providers.

Each packet may be forwarded by a node 102 over the network 100 to an input port 106 of a router 104. For each received packet, a router may be configured to either drop the received packet or store the received packet in a queue associated with one or multiple output ports (e.g., ports 108 or 106). Each port may be associated with one or more FIFO buffers, and each buffer is configured to store a queue of received packets. For each queue, the router determines whether or not a received packet should be retained in such queue or discarded as further described below. The router also is generally configured to transfer each queued packet, e.g., in a first in, first out order, from its associated output port over the network towards another router or node.

As each buffer fills with a queue of packets, mechanisms for fair bandwidth partitioning and/or drop precedence may be implemented. Two general approaches that attempt to provide drop precedence or fair bandwidth partitioning are Weighted Random Early Detection (WRED) and Approximate Fair Dropping (AFD). WRED is described in Lin et al., U.S. Pat. No. 6,463,068, issued Oct. 8, 2002, which is herein incorporated by reference in its entirety. Several embodiments of an AFD process are described in Pan et al., "Approximate Fairness through Differential Dropping," ACM SIGCOMM Computer Communication Review, Vol. 33, Issue 2 (April 2003), pp. 23-39 and U.S. Application, having Publication No. 2007/0091802, filed 24 Oct. 2005 by Pan et al., and such article and patent application are herein incorporated by reference in their entirety. Embodiments of the present invention may be combined with any WRED or AFD processes, e.g., as described, respectively, in the referenced Lin et al. patent and the Pan et al. references.

Figure 2:
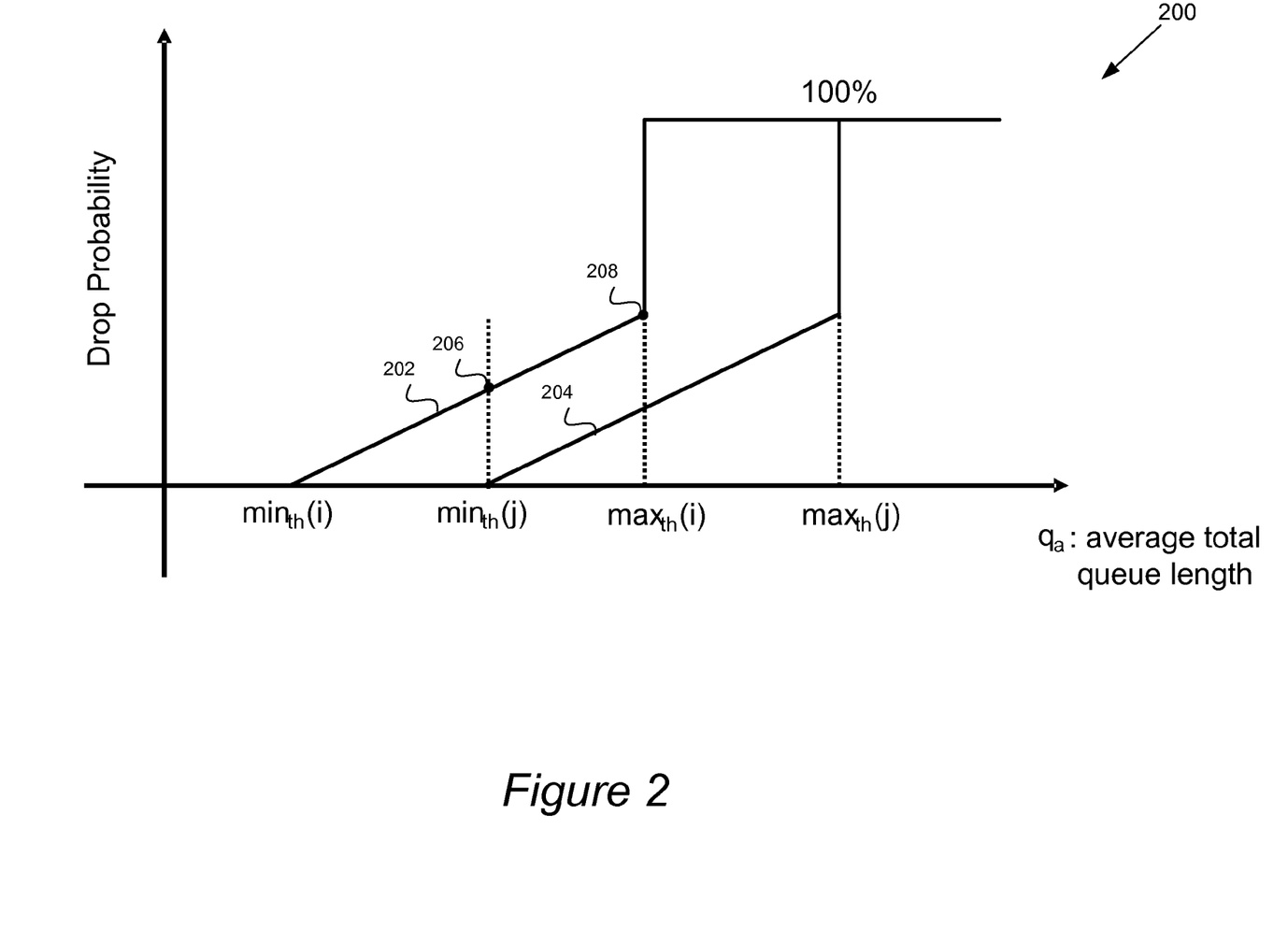
FIG. 2 is a chart illustrating drop probabilities for two different classes as a function of an average total queue length.

In WRED, packets are either dropped or retained/admitted based on a drop probability that is determined on a per class basis. FIG. 2 is a chart illustrating drop probabilities for two different classes 202 and 204 as a function of an average total queue length. As shown, a first class i 202 has a drop probability equal to zero (no packets are dropped) when the average queue length is below a minimum threshold $min_{th}(i)$, and a drop probability equal to 1 or 100% (all packets are dropped) when the average queue length exceeds a maximum threshold $max_{th}(i)$. The drop probability for class i varies between the queue thresholds $min_{th}(i)$ and $max_{th}(i)$ as shown in the graph. The drop probability for class j 204 behaves similarly, but with different thresholds. For example, the minimum threshold for class j, $min_{th}(j)$, is higher than the minimum threshold for class i, $min_{th}(i)$. Likewise, the maximum threshold for class j, $max_{th}(i)$, is higher than the maximum threshold for class i, $max_{th}(i)$. Thus, the lower priority classes are typically dropped first as the queue length increases.

Although different drop probability thresholds are available for the WRED approach so as to provide a limited level of fairness, this approach sometimes fails to provide fair use of the bandwidth by each class (e.g., does not provide weighted fair bandwidth allocation) since this queue management scheme only provides a drop preference that is based on the total aggregate queue length. For example, if traffic is heavy and the aggregate queue length increases towards a target threshold, all the packets of a lower class may be dropped even when such lower class is only sending a minimum number of packets. Conversely, if a particular malicious user is sending a large amount of data and they are associated with a higher class than a user with a lower class, their packets will get through. This result is unfair because the packets that use an unusually high amount of bandwidth should be dropped (and such malicious user penalized) even if such packets are associated with a higher class.

AFD, on the other hand, can provide a fairer bandwidth allocation with respect to multiple flows of packets entering a queue. In general, a flow can be defined as a stream of packets with the same source-destination addresses, although other definitions of flows could be used. AFD bases its packet dropping decisions on arrival rates for particular packet flows (e.g., a recent history of packet arrivals for the packet flows), as well as the queue length. AFD generally determines for each packet flow or class a drop probability based on a fair share function, which is based on the current flow rate for such packet flow and changes in the queue length (e.g., whether the queue length is approaching or moving away from a queue length target). In a simple example, the different classes have equal fair share portions of the total capacity. For instance, if there are two flows, the drop probability is determined so that each flow gets half of the total capacity. Although AFD provides a fairer bandwidth allocation scheme, AFD does not provide mechanisms for preferentially dropping or admitting certain classes. For example, one may wish to preferentially drop packets for a very low priority "scavenger" class.

Certain embodiments of the present invention provide both weighted fair bandwidth allocation and drop precedence in a hybrid scheme as further described below. For example, a scavenger class can be given strict drop precedence while maintaining fair bandwidth allocation among the other classes. In another example, a high priority class can be given preferential drop preference (no dropping) while allocating the remaining available bandwidth among the other classes.

Figure 3A:
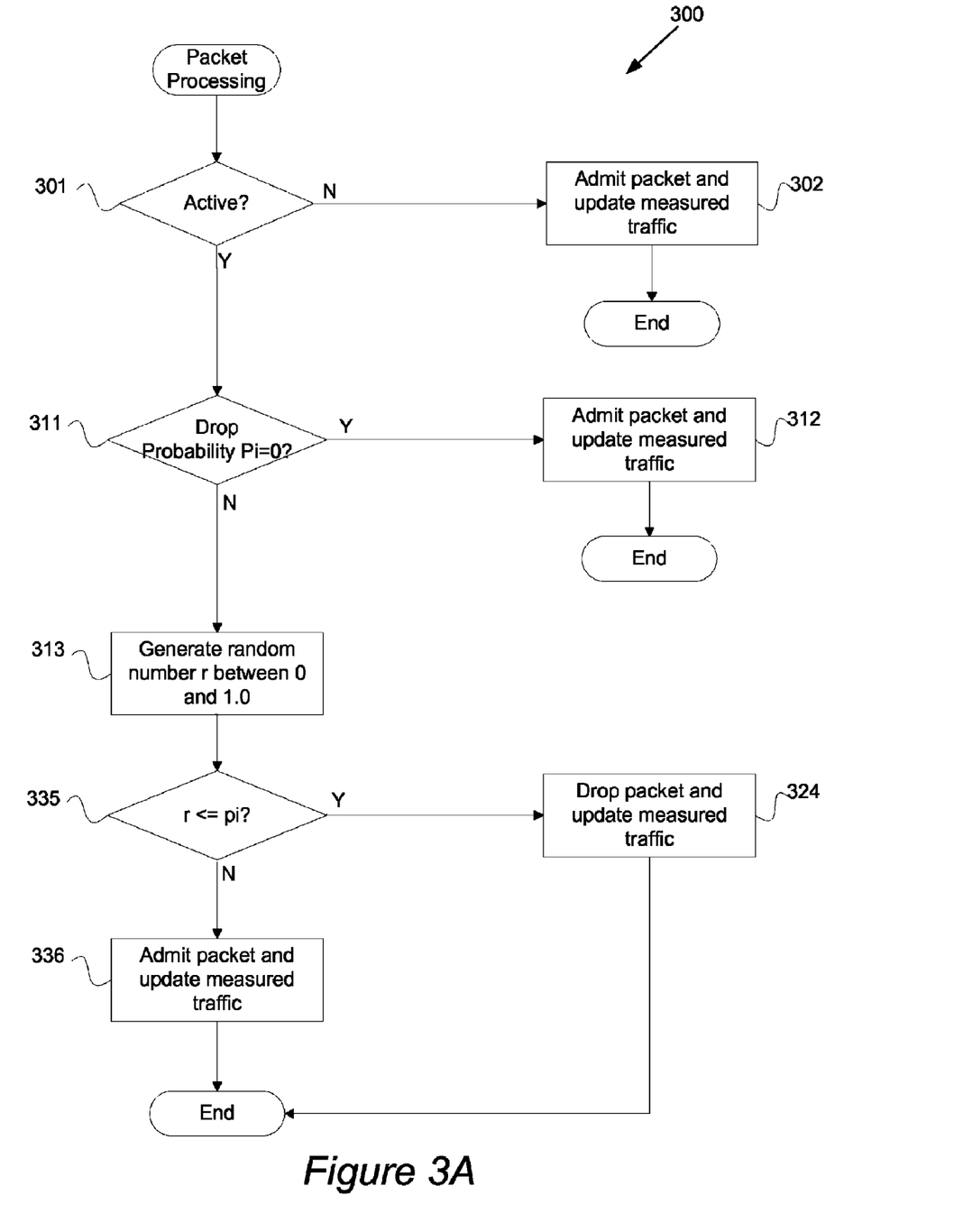
FIG. 3A is a flowchart illustrating a procedure for handling incoming packets for a particular queue in accordance with one implementation of the present invention

FIG. 3A is a flowchart illustrating a data path procedure 300 for handling incoming packets for a particular queue in accordance with one implementation of the present invention. Detailed embodiments for generally handling received packets with respect to a particular queue are further described in U.S. patent application, having Publication No. 2007/0091802 A1, filed 24 Oct. 2005 by Pan et al., which application is incorporated herein by reference for all purposes. Processing of a particular received packet can begin with operation 301, in which it may be determined whether a current state is active. Setting of the active or inactive state is further described below. If the current state is not active, the packet can be admitted and the measured amount of arrived traffic can be updated in operation 302, and processing of the received packet can be complete.

It may then be determined whether the drop probability, $p_i$, for the class of the received packet is zero in operation 311. If the drop probability of the class of the received packet is zero, the packet can be admitted and the measured amount of arrived traffic can be updated in operation 312. Processing of the received packet can then be complete.

Otherwise, if the drop probability is not zero for the class of the received packet, a random number, r, between 0 and 1.0 may be generated in operation 313. It may then be determined whether the received packet is to be dropped based on comparing this generated random number, r, and the drop probability associated with the class of the received packet, for example by determining whether the generated random number, r, is less than or equal to the drop probability, $p_i$, as illustrated in operation 335. If the received packet is to be dropped as indicated by the associated drop probability and random number (e.g., $r \leq p_i$), then the received packet can be dropped and the measured amount of arrived traffic can be updated in operation 324, and processing of the received packet can then be complete. Otherwise, if the received packet is not to be dropped according to the associated drop probability and random number (e.g., $r > p_i$), the received packet can be admitted and the measured amount of arrived traffic can be updated in operation 336. Processing of the received packet can then be completed.

Figure 3B:
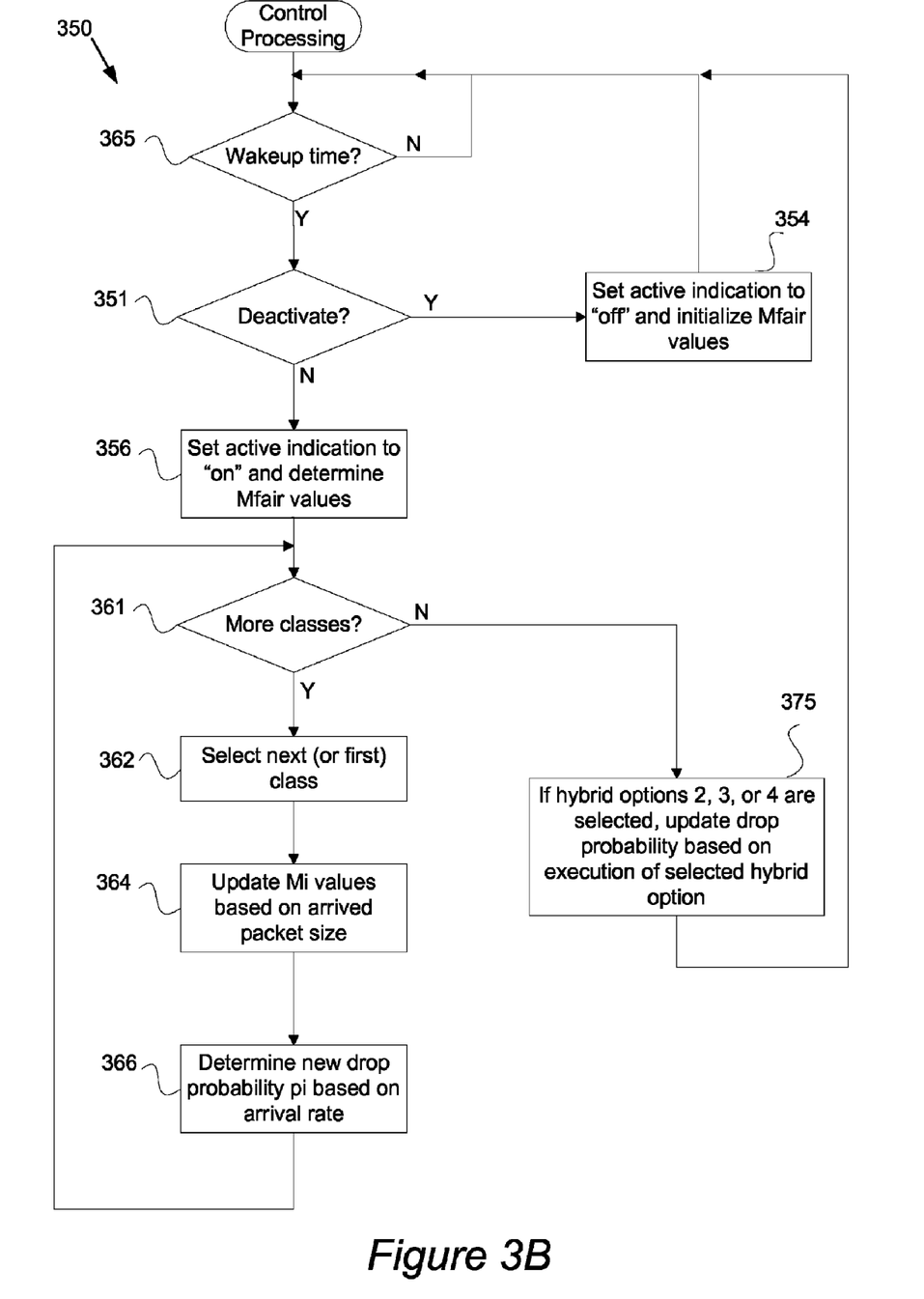
FIG. 3B is a flowchart illustrating a hybrid AFD process in accordance with one implementation of the present invention.

FIG. 3B is a flowchart illustrating a hybrid AFD process 350 (e.g., a control path process) in accordance with one implementation of the present invention. This hybrid AFD processing can be periodically performed based on any suitable criteria, e.g., after a set time or after processing of a predetermined number of packets greater than one. In one embodiment, this processing is performed every ten or twenty milliseconds. The illustrated embodiment of FIG. 3B is described with respect to a single queue, but could be repeated for multiple queues.

Initially, the process can start by continuing to determine whether the current wakeup time has been reached in process block 365. When it is the current wakeup time, it may be determined whether to set the current state to inactive in operation 351. If the current state should be set to inactive, the state can then be set to inactive (e.g., active is set "off") and the current fair share values for the queue can be initialized in operation 354. Otherwise, in process block 356, the state can be set to active and the current fair share values for the queue can be determined or updated.

There may be, for example, two situations for which the current state can be set to inactive: when the queue length falls below a predetermined threshold (e.g., to ensure that there is enough data in the queue to maximize link utilization), and/or when the total packet arrival rate is below another predetermined threshold (e.g., to ensure that the class-based bandwidth partitioning mechanism has enough data to appropriately partition the bandwidth). In one embodiment, if one of these two conditions is met, the current state is set to inactive and current fair share values are initialized. Otherwise, the state is set to active, and the current fair share values can be calculated or updated.

Initialization or updating of fair share values for the current queue can be determined by any suitable technique (e.g., imposing maximum and minimum values, etc.). For example in an inactive state, a fair share value of a current class can be initialized to a maximum allowed fair share value divided by the number of classes. Approximate Fair Dropping (AFD) techniques are further described in the above referenced Pan et al. U.S. patent application and an article by Pan et al., "Approximate Fairness through Differential Dropping," ACM SIGCOMM Computer Communication Review, Vol. 33, Issue 2 (April 2003), pp. 23-39.

As determined in process block 361, while there are more classes of packets for the queue to process, process blocks 362, 364, and 366 can be repeated for each class. In process block 362, a next (or first) class of packet can be selected if there are more classes. In process block 364, the arrival rate, $M_i$, for the current class of packets can be updated based on the arrived packet size. In process block 366, the drop probability, $p_i$, for the current class can be determined based on the arrival rate, $M_i$, (and fair share values). The process can then return to operation 361 to determine whether there are more classes to process.

Embodiments of the present invention can provide different hybrid options for determining drop probabilities, besides the above described normal AFD process. In one embodiment, the hybrid options include options 1~4. Option 1 determines drop probability via a normal AFD process, e.g., based on arrival rates (and fair share values) as indicated in operation 366. Hybrid options 2~4 determine drop probabilities by accounting for some form of drop precedence as further described below. Thus, in the illustrated example, if drop probabilities have been determined for all classes and if hybrid options 2, 3, or 4 are selected, the drop probability can be updated based on execution of the selected option in operation 375. Of course, a selected hybrid option 2, 3, or 4 may be alternatively executed before the drop probability has been determined for all classes, e.g., after a selected number of classes.

Different hybrid options may be selected at different time periods and performed according to such selections in the procedure 300 of FIG. 3A. For example, a normal AFD process (e.g., option 1) may be initially selected for a particular period of time, and after such time period one of options 2~4 may then be selected. Each option may continue in force until another option is selected.

A normal AFD process may be implemented in any suitable manner. In general, a normal AFD process may be performed for each of the classes to determine their corresponding arrival rates ($M_i$) and drop probabilities ($D_i$). One embodiment includes the ability to delay these determinations for an additional time period using a standard wakeup counter. First, the arrival rate ($M_i$) for the corresponding class may be determined by aging the old measured arrival rate (shifting its value), adding in the additional measured arrival traffic $M_{new(i)}$, and then resetting the additional measured arrival rate (which can be incremented during the data path processing, such as that illustrated in FIG. 3A). Next, one embodiment may include allowing the use of a weighted fair share, and performing such a weighted adjustment. Finally, the drop probability for the current class of packets may be determined based on the determined arrival rate and fair share. This drop probability determination can be performed using a division operation or an approximation mechanism (e.g., binary search of possible values) to approximate the drop probability to one of a set of predetermined values. This arrival rate and drop rate determinations can be repeated for each of the classes of packets, with the entire control path processing periodically repeated.

Figure 4:
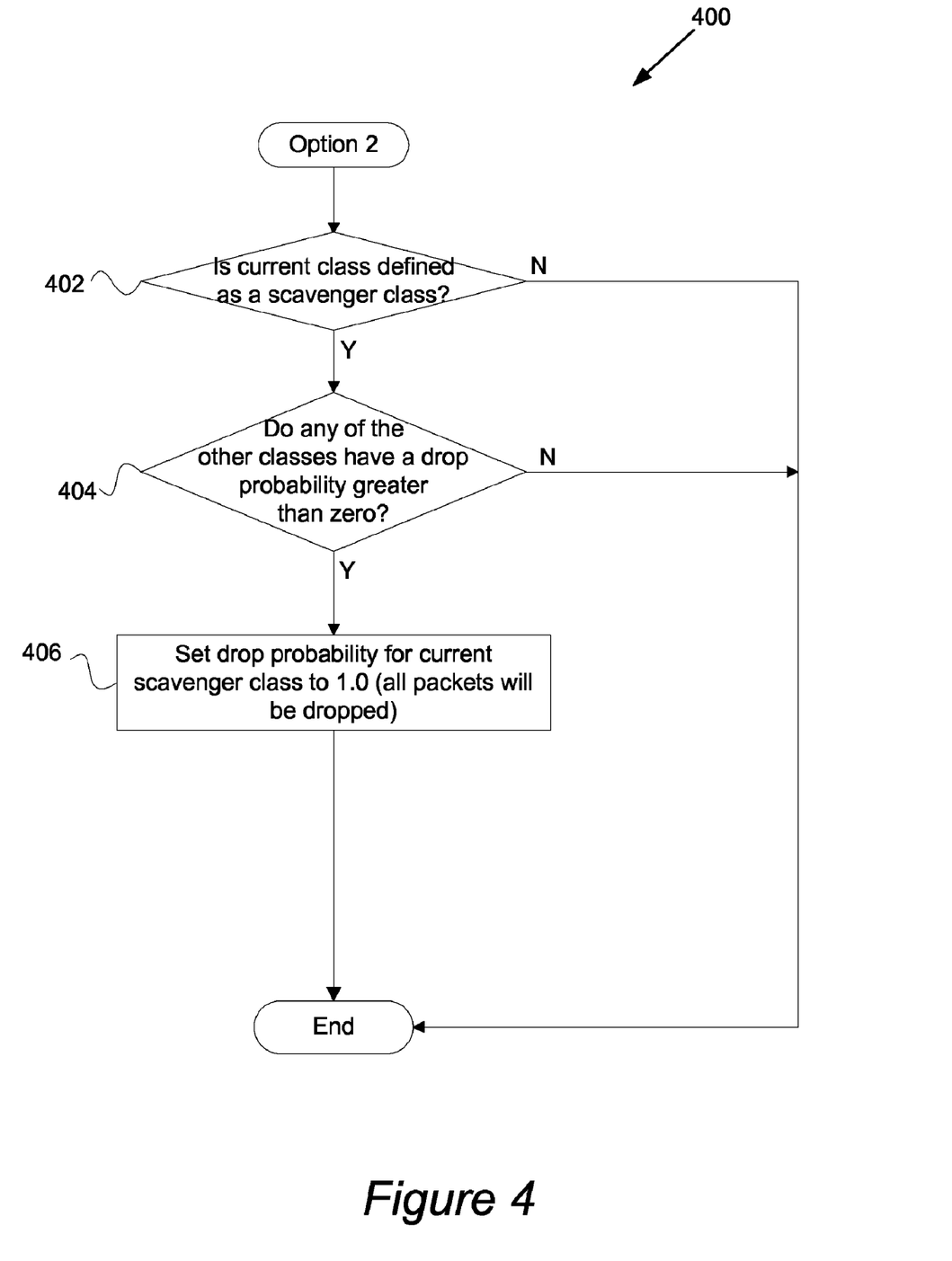
FIG. 4 is a flowchart illustrating a procedure for implementing a second hybrid option in accordance with one embodiment of the present invention.

FIG. 4 is a flowchart illustrating a procedure 400 for implementing hybrid option 2 in accordance with one embodiment of the present invention. The result of this option 2 can overwrite the result of the above drop probability that was determined using a normal AFD process. Option 2 generally operates to always drop lowest or scavenger class packets if any of the other higher classes is experiencing any congestion. Initially, it may be determined whether the current class is defined as a scavenger class in operation 402. For instance, a scavenger class may be defined based on specific identifying information in the received packet, such as source address or an identifier, predefined class index, etc. If the current class is a scavenger class, it may then be determined whether any of the other classes have a drop probability greater than zero in operation 404. In other words, it is determined whether there is any congestion for any non-scavenger class.

If any of the other classes have a drop probability greater than zero (e.g., one or more of the other classes have a drop probability so that the associated packets have a chance of being dropped), the drop probability for the current scavenger class may then be set to 1.0 in operation 406. In other words, all the packets of the scavenger class will be dropped if other classes are experiencing congestion. Otherwise, if the current class is not a scavenger class or any of the other classes do not have a drop probability greater than zero (e.g., no congestion), the drop probability that was based on a fair bandwidth allocation (e.g., the normal AFD process of FIG. 3B) may be used for the current class.

Figure 5:
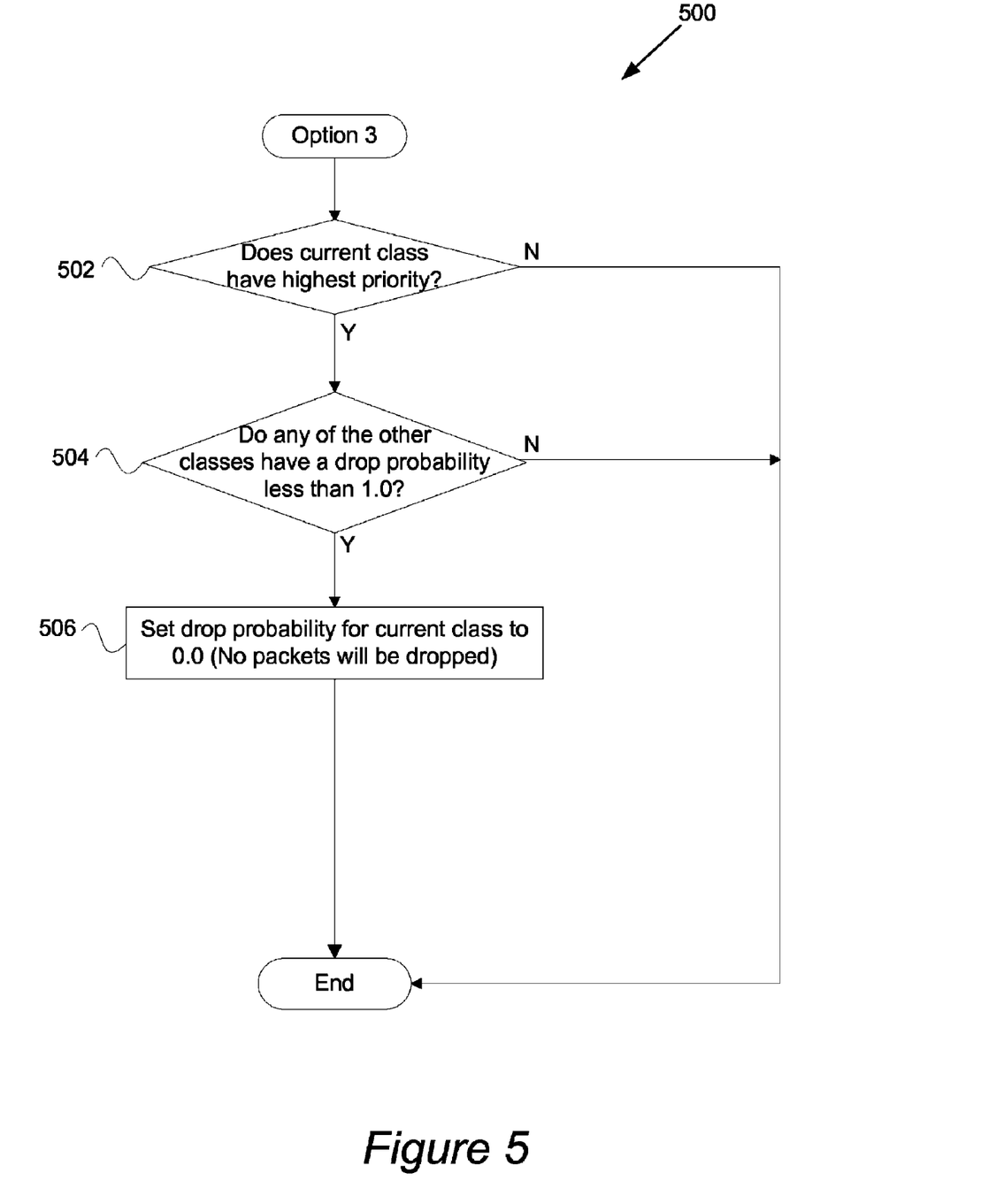
FIG. 5 is a flowchart illustrating a procedure for implementing a third hybrid option in accordance with one embodiment of the present invention.

FIG. 5 is a flowchart illustrating a procedure 500 for implementing hybrid option 3 in accordance with a specific embodiment of the present invention. The result of this option 3 can overwrite the result of the above drop probability that was determined using a normal AFD process. In general, with option 3, the highest class packets are not dropped if the lower class packets are not being completely dropped. Initially for option 3, it may be determined whether the current class has the highest priority in operation 502. Alternatively, more than one class may be defined as having a highest priority and it may be determined whether the current class belongs to a set of highest priority classes for which option 3 is implemented.

If the current class has a highest priority, it may then be determined whether any of the other classes have a drop probability that is less than 1.0 in operation 504. If a particular class has a drop probability that is less than 1.0, the packets of such class have a chance to not get dropped. That is, not all the packets of a class with a drop probability of 1.0 will be dropped.

If any of the other classes have a drop probability that is less than 1.0, the drop probability for the current class is then set to zero in operation 506. In other words, no packets will be dropped for the current class. In effect, if the lower classes are not being completely dropped, all of the highest priority packets can continue to be admitted without ever dropping them. Otherwise, if the current class is not the highest priority or any of the other classes do not have a drop probability that is less than 1.0 (e.g., no classes are being totally dropped), the drop probability that was determined based on a fair bandwidth allocation for all classes (e.g., normal AFD) may be utilized for the current class. In the situation in which all of the lower classes are being completely dropped, packets of the highest class can then be dropped based on the determined drop probability.

Figure 6:
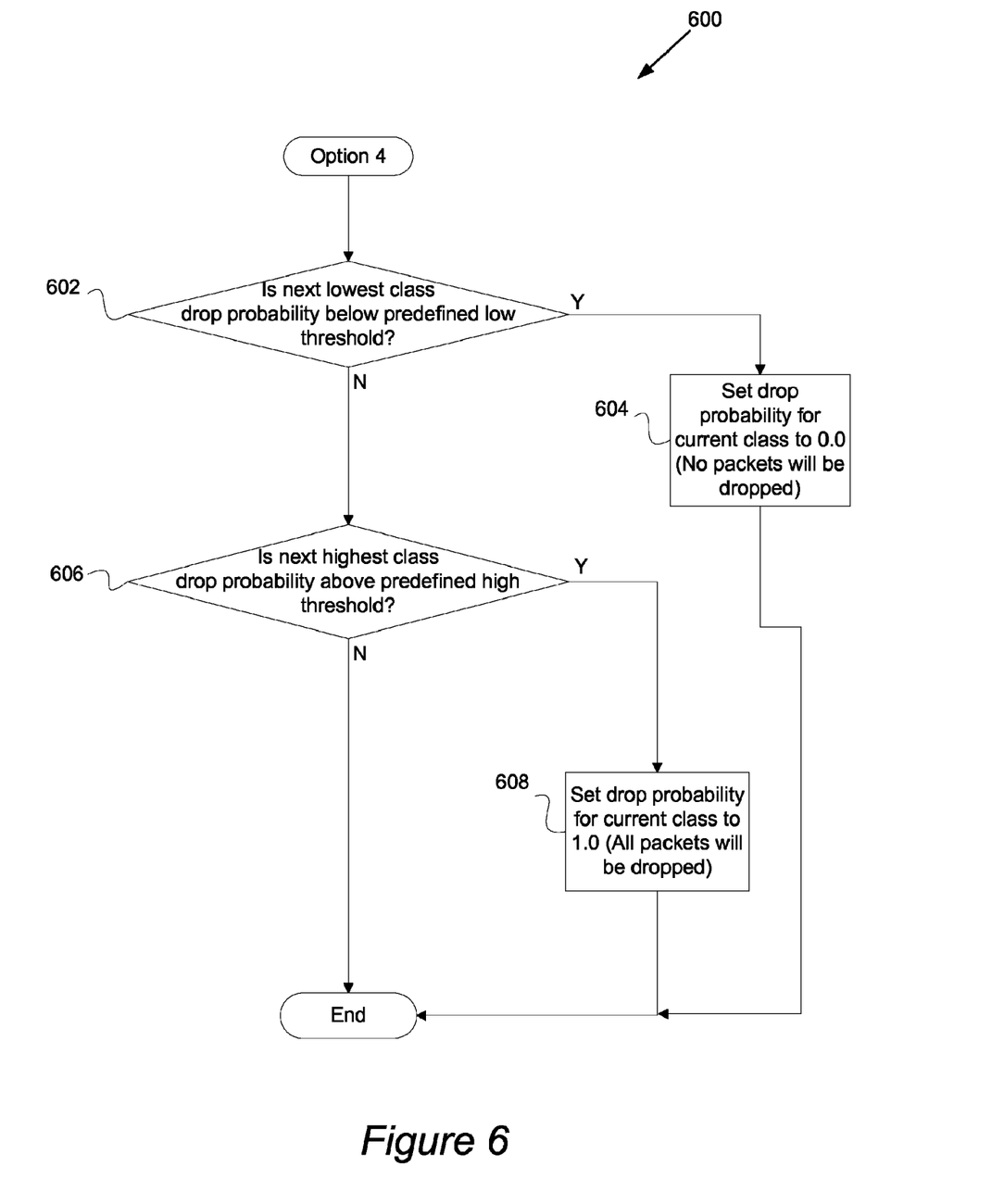
FIG. 6 is a flowchart illustrating a procedure for implementing a fourth option in accordance with one embodiment of the present invention.

FIG. 6 is a flowchart illustrating a procedure 600 for implementing hybrid option 4 in accordance with one embodiment of the present invention. The result of this option 4 can overwrite the result of the above drop probability that was determined using a fair bandwidth allocation process. Option 4 is a strict drop precedent process that generally operates to inhibit dropping of traffic from the current class if a lower class is not being completely dropped or is not yet experiencing a predefined minimum drop level, while completely dropping such current class packets when a higher class would incur any drops or has reached a predefined maximum drop level.

Referring to the illustrated example of FIG. 6, it may initially be determined whether a next lowest class drop probability is below a predefined low threshold is operation 602. A low threshold may be defined as any suitable value, such as 1.0. Alternatively, the low threshold for a current class can be defined as the drop probability of the lower class that corresponds to the WRED defined minimum threshold for such current class. Referring to FIG. 2, the low threshold for class j 204 can be defined as equal to the drop probability 206 for class i 202 that corresponds to the minimum queue length threshold point, $min_{th}(j)$ for class j 204.

If the lower class drop probability is below this predefined low threshold, the drop probability for the current class may be set to zero in operation 604 and the option 4 process end. Otherwise it may be determined whether the next highest class drop probability is above a predefined high threshold in operation 606. A predefined high threshold may be set to any suitable value, such as zero. Alternatively, the high threshold for a current class can be defined as the drop probability of the next highest class that corresponds to the WRED defined maximum threshold for such current class. Referring to FIG. 2, the high threshold for class i 202 can be defined as equal to the drop probability 208 that corresponds to the maximum queue length threshold point, $min_{th}(i)$ for class i 202.

If the next highest class' drop probability is above this predefined high threshold, the drop probability for the current class may be set to 1.0 in operation 608 and the option 4 process ends. Otherwise, the drop probability that was calculated based on a fair bandwidth allocation may be used for the current class.

In summary, certain embodiments of the present invention can provide both weighted fair bandwidth allocation and one or more drop precedence factors for determining whether to drop or admit particular packet classes to a queue. For example, a scavenger class can be given strict drop precedence while maintaining fair bandwidth allocation among the other classes. In another example, a high priority class can be given preferential drop preference (no dropping) while allocating the remaining available bandwidth among the other classes. In yet another example, incremental drop precedence is provided.

Generally, the techniques for implementing the present invention may be implemented on software and/or hardware. For example, these techniques can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the authentication systems of this invention may be a specially configured switch such as the Catalyst 6500, 4900, 4500, 3750, 3560, Nexus 7000, or Express 500 Series available from Cisco Systems, Inc. of San Jose, Calif. A general architecture for some of these machines will appear from the description given below. In an alternative embodiment, the system may be implemented on a general-purpose network host machine such as a personal computer or workstation. Further, the invention may be at least partially implemented on a card (for example, an interface card) for a network device or a general-purpose computing device.

Figure 7:
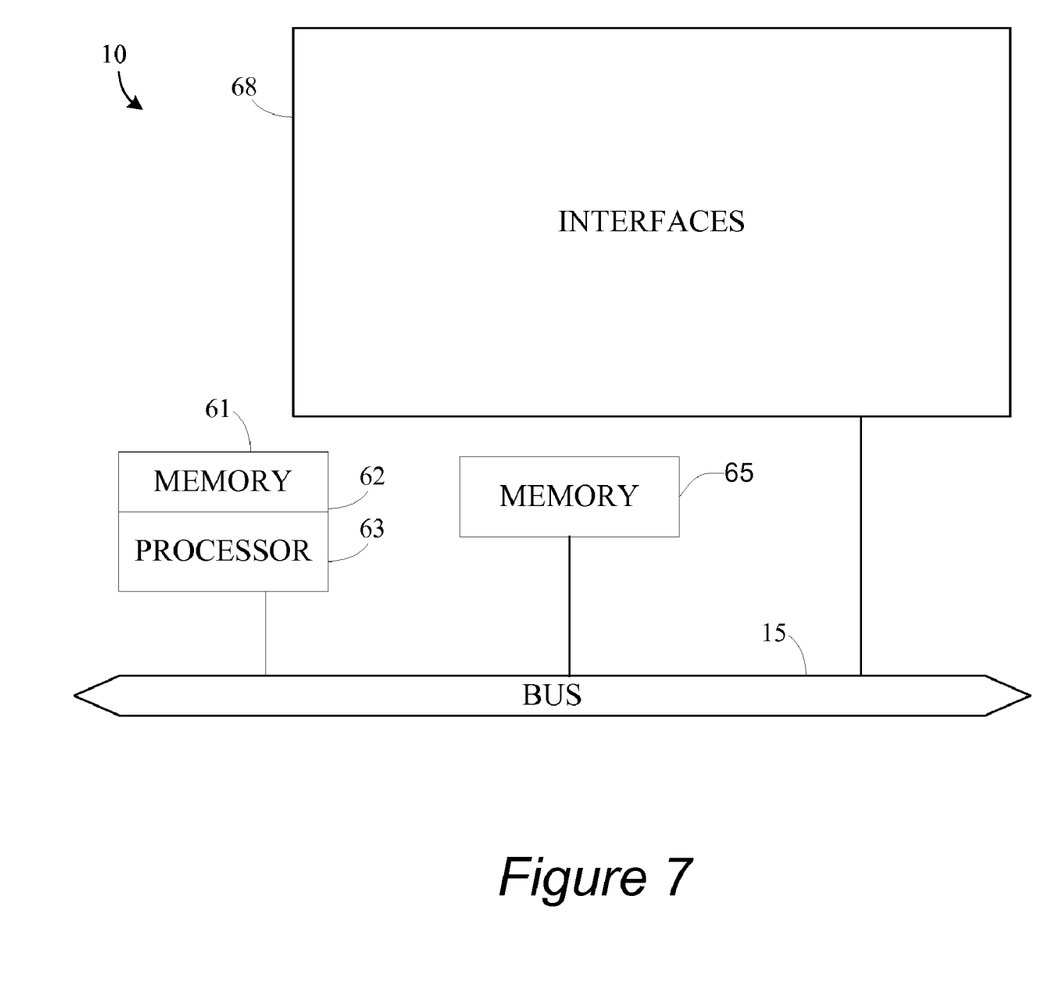
FIG. 7 illustrates an example switch suitable for implementing embodiments of the present invention.

Referring now to FIG. 7, a switch 10 suitable for implementing embodiments of the present invention includes a master central processing unit (CPU) 62, interfaces 68, and a bus 15 (for example, a PCI bus). When acting under the control of appropriate software or firmware, the CPU 62 is responsible for such tasks as switching and/or routing computations and network management. It preferably accomplishes all these functions under the control of software including an operating system (for example, the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of switch 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of packets or packet segments over the network and sometimes support other peripherals used with the switch 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching and/or routing, media control and management. By providing separate processors for the communications intensive tasks, these interfaces allow the master microprocessor 62 to efficiently perform switching and/or routing computations, network diagnostics, security functions, etc.

Although the system shown in FIG. 7 is one specific switch of the present invention, it is by no means the only switch architecture on which the present invention can be implemented. For example, an architecture having a single processor that handles communications as well as switching and/or routing computations, etc. is often used. Further, other types of interfaces and media could also be used with the switch.

Regardless of a network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications. The memory or memories may also be configured to store fair share values and parameters, burst thresholds, minimum and maximum thresholds, option selection bits, class parameters/specifications, timers, queue characteristics, packet arrival history parameters, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, although authentication has been described as authorizing a single device for accessing a single domain, of course, a single device may be authorized to access a plurality of different domains or multiple devices may be authorized to access a same domain. Therefore, the present embodiments are to be considered as illustrative and not restrictive and the invention is not to be limited to the details given herein, but may be modified within the scope and equivalents of the appended claims.

What is claimed is:

1. A method comprising:
   determining a drop probability for each of a plurality of classes of packets being dropped or admitted to a queue of a network device, wherein each drop probability is based on a weighted fair bandwidth allocation process that is performed with respect to the plurality of classes and a plurality of packet arrival rates and weights for such classes; and
   dropping a particular packet or admitting such particular packet to the queue based on the drop probability for such particular packet's class, wherein such dropping or admitting operation is further based on one or more drop precedence factors that are also determined periodically for each class if such one or more drop precedence factors are selected for such each class,
   wherein the one or more drop precedence factors for the particular packet's class override the drop probability for such particular packet's class with respect to dropping the particular packet or admitting the particular packet to the queue if such one or more drop precedence factors are selected.

2. The method as recited in claim 1, wherein the particular packet is always dropped if the particular packet belongs to a lowest priority or scavenger class and the other classes are experiencing some congestion, and wherein the drop probability of the other classes continues to be based on a weighted fair bandwidth allocation process.

3. The method as recited in claim 2, further comprising setting the drop probability of the particular packet's class to 1.0 if the particular packet's class belongs to the lowest priority or scavenger class and any of the other classes have a drop probability that is greater than zero.

4. The method as recited in claim 1, wherein the particular packet is never dropped if such particular packet belongs to a highest class and any of the other classes are not being completely dropped and wherein the drop probability of the other classes continues to be based on a weighted fair bandwidth allocation process.

5. The method as recited in claim 4, further comprising setting the drop probability of the particular packet's class to zero if the particular packet belongs to a highest class and any of the other classes have a drop probability that is less than 1.0.

6. The method as recited in claim 1, wherein the particular packet belongs to a highest class and all packets that are received for such highest class continue to be admitted to the queue until all incoming packets of the other lower classes are being completely dropped.

7. The method as recited in claim 1, wherein dropping of the particular packet is inhibited if a lower class is not being completely dropped and wherein all packets from the particular packet's class will be completely dropped when a higher class is incurring any drops.

8. The method as recited in claim 7, further comprising:
   setting the drop probability of the particular packet's class to zero if a next lowest class has a drop probability that is below a first predefined threshold; and
   setting the drop probability of the particular packet's class to 1.0 if a next highest class has a drop probability that is above a second predefined threshold.

9. The method as recited in claim 8, wherein the first predefined threshold equals a drop probability of the next lowest class that corresponds to a predefined minimum queue length threshold for the particular packet's class.

10. An apparatus comprising:
    one or more processors;
    one or more memory, wherein at least one of the processors and memory are adapted for:
       determining a drop probability for each of a plurality of classes of packets being dropped or admitted to a queue, wherein each drop probability is based on a weighted fair bandwidth allocation process that is performed with respect to the plurality of classes and a plurality of packet arrival rates and weights for such classes; and
       dropping a particular packet or admitting such particular packet to the queue based on the drop probability for such particular packet's class, wherein such dropping or admitting operation is further based on one or more drop precedence factors that are also determined periodically for each class if such one or more drop precedence factors are selected for such each class,
       wherein the one or more drop precedence factors for the particular packet's class override the drop probability for such particular packet's class with respect to dropping the particular packet or admitting the particular packet to the queue if such one or more drop precedence factors are selected.

11. The apparatus as recited in claim 10, wherein the particular packet is always dropped if the particular packet belongs to a lowest priority or scavenger class and the other classes are experiencing some congestion, and wherein the drop probability of the other classes continues to be based on a weighted fair bandwidth allocation process.

12. The apparatus as recited in claim 11, wherein the at least one of the processors and memory are further adapted for setting the drop probability of the particular packet's class to 1.0 if the particular packet's class belongs to the lowest priority or scavenger class and any of the other classes have a drop probability that is greater than zero.

13. The apparatus as recited in claim 10, wherein the particular packet is never dropped if such particular packet belongs to a highest class and any of the other classes are not being completely dropped and wherein the drop probability of the other classes continues to be based on a weighted fair bandwidth allocation process, and wherein the at least one of the processors and memory are further adapted for setting the drop probability of the particular packet's class to zero if the particular packet belongs to a highest class and any of the other classes have a drop probability that is less than 1.0.

14. The apparatus as recited in claim 10, wherein the particular packet belongs to a highest class and all packets that are received for such highest class continue to be admitted to the queue until all incoming packets of the other lower classes are being completely dropped.

15. The apparatus as recited in claim 10, wherein dropping of the particular packet is inhibited if a lower class is not being completely dropped and wherein all packets from the particular packet's class will be completely dropped when a higher class is incurring any drops.

16. The apparatus as recited in claim 15, wherein the at least one of the processors and memory are further adapted for:
  setting the drop probability of the particular packet's class to zero if a next lowest class has a drop probability that is below a first predefined threshold; and
  setting the drop probability of the particular packet's class to 1.0 if a next highest class has a drop probability that is above a second predefined threshold.

17. The apparatus as recited in claim 16, wherein the first predefined threshold equals a drop probability of the next lowest class that corresponds to a predefined minimum queue length threshold for the particular packet's class.

18. At least one non-transitory computer readable storage medium having computer program instructions stored thereon that are arranged to perform the following operations:
  determining a drop probability for each of a plurality of classes of packets being dropped or admitted to a queue of a network device, wherein each drop probability is based on a weighted fair bandwidth allocation process that is performed with respect to the plurality of classes and a plurality of packet arrival rates and weights for such classes; and
  dropping a particular packet or admitting such particular packet to the queue based on the drop probability for such particular packet's class, wherein such dropping or admitting operation is further based on one or more drop precedence factors that are also determined periodically for each class if such one or more drop precedence factors are selected for such each class,
  wherein the one or more drop precedence factors for the particular packet's class override the drop probability for such particular packet's class with respect to dropping the particular packet or admitting the particular packet to the queue if such one or more drop precedence factors are selected.

* * * * *